(12) United States Patent
Kang et al.

(10) Patent No.: US 11,343,771 B2
(45) Date of Patent: *May 24, 2022

(54) WIRELESS COMMUNICATION APPARATUS AND METHOD FOR PERFORMING ENERGY-EFFICIENT LINK ADAPTATION

(71) Applicant: SAMSUNG ELECTRONICS CO., LTD., Suwon-si (KR)

(72) Inventors: Young-yun Kang, Hwaseong-si (KR); Yoo-keun Kang, Seoul (KR); Eon-jong Kim, Hwaseong-si (KR); Min-ho Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,773

(22) Filed: Nov. 15, 2019

(65) Prior Publication Data
US 2020/0084719 A1 Mar. 12, 2020

Related U.S. Application Data

(63) Continuation of application No. 15/703,301, filed on Sep. 13, 2017, now Pat. No. 10,506,514.

(30) Foreign Application Priority Data

Mar. 15, 2017 (KR) .......................... 10-2017-0032520

(51) Int. Cl.
*H04W 52/02* (2009.01)
*H04B 7/0417* (2017.01)
(Continued)

(52) U.S. Cl.
CPC ...... *H04W 52/0229* (2013.01); *H04B 7/0417* (2013.01); *H04B 7/0697* (2013.01);
(Continued)

(58) Field of Classification Search
CPC ............ H04W 52/0229; H04B 7/0417; H04B 7/0697
See application file for complete search history.

(56) References Cited

U.S. PATENT DOCUMENTS

| 7,782,829 B2 | 8/2010 | Miao et al. |
|---|---|---|
| 8,548,511 B2 | 10/2013 | Banister et al. |

(Continued)

FOREIGN PATENT DOCUMENTS

| CN | 102088789 A | 6/2011 |
|---|---|---|
| CN | 105338609 A | 2/2016 |

(Continued)

OTHER PUBLICATIONS

Communication dated Nov. 24, 2020 issued by the Korean Intellectual Property Office in counterpart Korean Application No. 10-2017-0032520.

(Continued)

*Primary Examiner* — Redentor Pasia
(74) *Attorney, Agent, or Firm* — Sughrue Mion, PLLC

(57) ABSTRACT

An operating method of a wireless communication apparatus including a plurality of antennas and receiving a data signal through a downlink channel from a base station includes: calculating a plurality of estimated energy efficiencies under a plurality of reception conditions of the wireless communication apparatus in accordance with prior information regarding a number of transmission ranks and a number of receiving antennas to be used for receiving the data signal; and generating channel state information by using the calculated estimated energy efficiencies and determining the number of receiving antennas.

17 Claims, 14 Drawing Sheets

(51) Int. Cl.
    *H04B 7/06*     (2006.01)
    *H04W 72/04*    (2009.01)

(52) U.S. Cl.
    CPC ....... *H04B 7/0632* (2013.01); *H04W 72/0413* (2013.01); *Y02D 30/70* (2020.08)

(56) References Cited

U.S. PATENT DOCUMENTS

| | | |
|---|---|---|
| 8,792,538 B2 | 7/2014 | Zhang et al. |
| 8,838,161 B2 | 9/2014 | Lee et al. |
| 8,873,515 B2 | 10/2014 | Kasturi et al. |
| 8,897,731 B2 | 11/2014 | Mujtaba et al. |
| 9,088,944 B2 | 7/2015 | Byun et al. |
| 9,214,999 B2 | 12/2015 | Soriaga et al. |
| 9,264,911 B2 | 2/2016 | Lee et al. |
| 9,294,310 B2 | 3/2016 | Wu et al. |
| 9,344,175 B2 | 5/2016 | Lee et al. |
| 9,363,749 B2 | 6/2016 | Mathew et al. |
| 2009/0010354 A1 | 1/2009 | Sudo |
| 2009/0124300 A1 | 5/2009 | Park et al. |
| 2010/0040120 A1* | 2/2010 | Sharma ............. H04W 52/0229 375/219 |
| 2010/0284449 A1* | 11/2010 | de Veciana ....... H04W 52/0261 375/219 |
| 2012/0087397 A1 | 4/2012 | Sudo |
| 2012/0134441 A1 | 5/2012 | Yokomakura et al. |
| 2012/0213177 A1* | 8/2012 | Lee .................. H04W 52/0216 370/329 |
| 2012/0257558 A1* | 10/2012 | Shin ................. H04W 52/0229 370/311 |
| 2013/0170416 A1 | 7/2013 | Gopalan et al. |
| 2013/0225094 A1 | 8/2013 | Mujtaba et al. |
| 2014/0098694 A1 | 4/2014 | Damji et al. |
| 2015/0092895 A1 | 4/2015 | Mujtaba et al. |
| 2015/0334653 A1* | 11/2015 | Ang .................. H04W 52/0219 370/311 |
| 2016/0014793 A1 | 1/2016 | Klemp et al. |
| 2016/0219506 A1 | 7/2016 | Pratt et al. |
| 2016/0309429 A1* | 10/2016 | Yin ..................... H04W 52/146 |
| 2017/0111863 A1* | 4/2017 | Kochery ........... H04W 52/0206 |
| 2017/0238299 A1* | 8/2017 | Koudouridis ........... H04W 8/22 370/311 |
| 2018/0049182 A1* | 2/2018 | Luo ..................... H04W 72/048 |
| 2018/0227166 A1* | 8/2018 | Palenius ........... H04W 52/0245 |
| 2018/0359653 A1* | 12/2018 | Svedman .............. H04W 24/10 |
| 2019/0121417 A1* | 4/2019 | Schneider ......... H04W 52/0216 |
| 2019/0239233 A1* | 8/2019 | Ryu ..................... H04B 7/0695 |
| 2020/0112409 A1* | 4/2020 | Kimura ................. H04L 5/0053 |
| 2020/0145069 A1* | 5/2020 | Ferrante .................. H04B 7/10 |

FOREIGN PATENT DOCUMENTS

| | | |
|---|---|---|
| CN | 106341216 A | 1/2017 |
| JP | 201118988 A | 1/2011 |
| KR | 10-2009-0047883 A | 5/2009 |
| KR | 10-2010-0053124 A | 5/2010 |
| KR | 10-2014-0122760 A | 10/2014 |
| KR | 10-2015-0042470 A | 4/2015 |
| KR | 10-2016-0133226 A | 11/2016 |
| WO | 2016/045748 A1 | 3/2016 |

OTHER PUBLICATIONS

Communication dated May 21, 2021 by the Korean Intellectual Property Office in Korean Patent Application No. 10-2017-0032520.

Communication dated Jun. 10, 2021 by National Intellectual Property Administration of P.R. China in Chinese Patent Application No. 201810170462.6.

* cited by examiner

| $(N_{RX}, N_{RANK})$ | Power[mW] (Estimated) |
|---|---|
| ⋮ | ⋮ |
| (4, 4) | 1400 |
| (4, 3) | 1360 |
| (4, 2) | 1220 |
| (4, 1) | 1140 |
| (3, 3) | 1190 |
| (3, 2) | 1145 |
| (3, 1) | 1060 |
| (2, 2) | 1040 |
| (2, 1) | 990 |
| (1, 1) | 910 |
| ⋮ | ⋮ |

| $N_{rank}$ | CQI | TRANSMISSION RATE (Estimated) |
|---|---|---|
| 1 | $C_{11}$ | $Est\_T_{11}$ |
| | $C_{12}$ | $Est\_T_{12}$ |
| | ⋮ | ⋮ |
| | $C_{1N}$ | $Est\_T_{1N}$ |
| 2 | $C_{21}$ | $Est\_T_{21}$ |
| | $C_{22}$ | $Est\_T_{22}$ |
| | ⋮ | ⋮ |
| | $C_{2N}$ | $Est\_T_{2N}$ |
| 3 | $C_{31}$ | $Est\_T_{31}$ |
| | $C_{32}$ | $Est\_T_{32}$ |
| | ⋮ | ⋮ |
| | $C_{3N}$ | $Est\_T_{3N}$ |
| 4 | $C_{41}$ | $Est\_T_{41}$ |
| | $C_{42}$ | $Est\_T_{42}$ |
| | ⋮ | ⋮ |
| | $C_{4N}$ | $Est\_T_{4N}$ |

⋮

| | | |
|---|---|---|
| K | $C_{K1}$ | $Est\_T_{K1}$ |
| | $C_{K2}$ | $Est\_T_{K2}$ |
| | ⋮ | ⋮ |
| | $C_{KN}$ | $Est\_T_{KN}$ |

| TRANSMISSION MODE | MODE_A |
|---|---|
| MAX RANK | K |
| ⋮ | ⋮ |

| ($N_{RX}$, $N_{RANK}$) | Power[mW] (Estimated) |
|---|---|
| ⋮ | ⋮ |
| (4, 4) | 1400 |
| (4, 3) | 1360 |
| (4, 2) | 1220 |
| (4, 1) | 1140 |
| (3, 3) | 1190 |
| (3, 2) | 1145 |
| (3, 1) | 1060 |
| (2, 2) | 1040 |
| (2, 1) | 990 |
| (1, 1) | 910 |
| ⋮ | ⋮ |

⎫ By MAX_Rank(4)

| $N_{rank}$ | CQI | TRANSMISSION RATE (Estimated) |
|---|---|---|
| 1 | $C_{11}$ | $Est\_T_{11}$ |
| | $C_{12}$ | $Est\_T_{12}$ |
| | ⋮ | ⋮ |
| | $C_{1N}$ | $Est\_T_{1N}$ |
| 2 | $C_{21}$ | $Est\_T_{21}$ |
| | $C_{22}$ | $Est\_T_{22}$ |
| | ⋮ | ⋮ |
| | $C_{2N}$ | $Est\_T_{2N}$ |
| 3 | $C_{31}$ | $Est\_T_{31}$ |
| | $C_{32}$ | $Est\_T_{32}$ |
| | ⋮ | ⋮ |
| | $C_{3N}$ | $Est\_T_{3N}$ |

By MAX_Rank(4)

| K | $C_{K1}$ | $Est\_T_{K1}$ |
|---|---|---|
| | $C_{K2}$ | $Est\_T_{K2}$ |
| | ⋮ | ⋮ |
| | $C_{KN}$ | $Est\_T_{KN}$ |

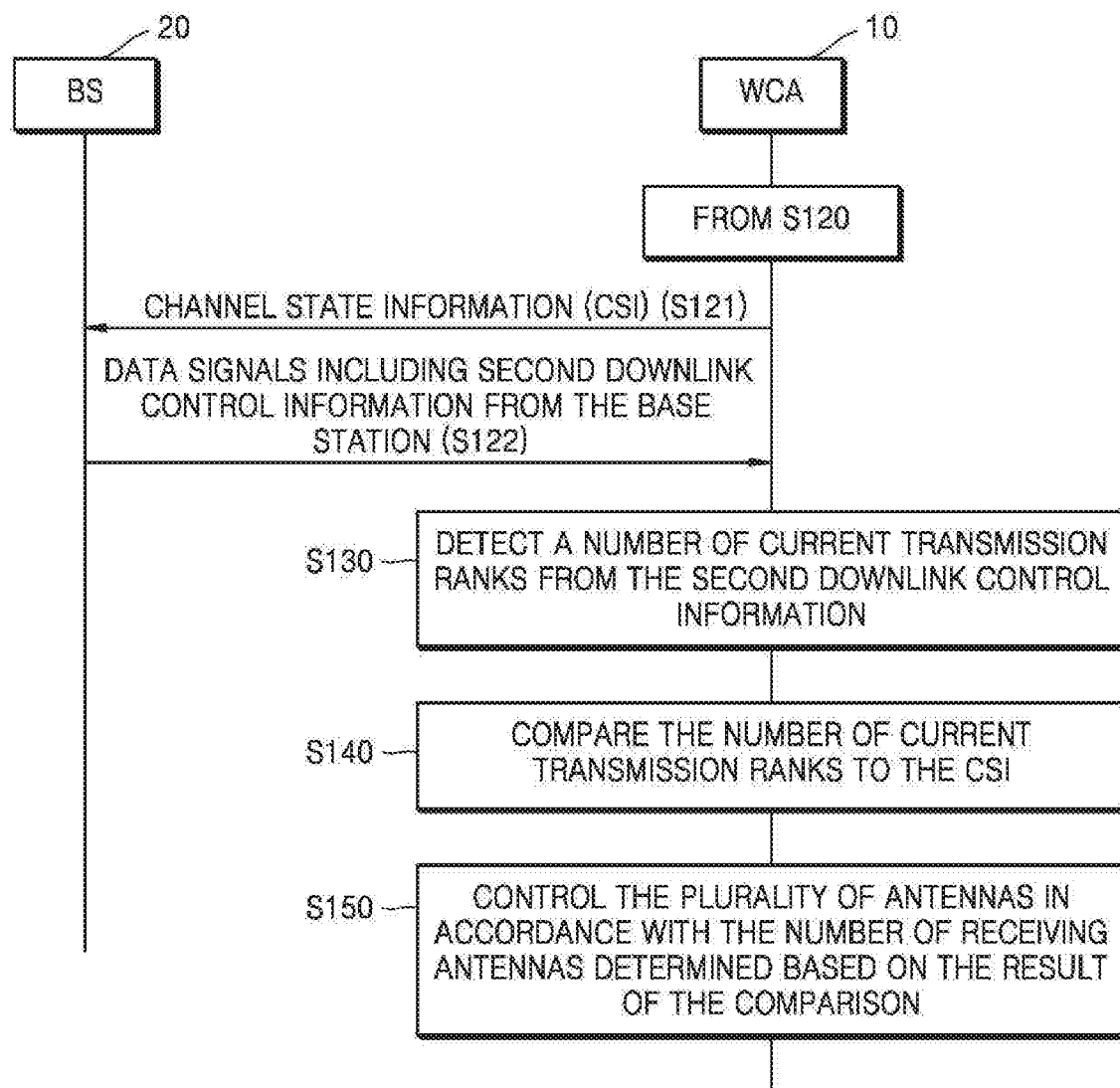

SEL INFO

| TYPE | REFERENCE_VALUE |
|---|---|
| BATTERY LEVEL | $REF\_LV_1$ |
| ENERGY EFFICIENCY LEVEL | $REF\_LV_2$ |
| CHANNEL CORRELATION LEVEL | $REF\_LV_3$ |
| RECEIVING ANTENNA NUMBER | $REF\_LV_4$ |
| MAX RANK NUMBER | $REF\_LV_5$ |
| DOPPLER SHIFT LEVEL | $REF\_LV_6$ |

242 ature has been performed. However, achieving multiplexing gains by spatial multiplexing in every channel environment has been problematic.
WIRELESS COMMUNICATION APPARATUS AND METHOD FOR PERFORMING ENERGY-EFFICIENT LINK ADAPTATION

CROSS-REFERENCE TO RELATED APPLICATIONS

This is a continuation of U.S. application Ser. No. 15/703,301 filed Sep. 13, 2017, which claims priority from Korean Patent Application No. 10-2017-0032520, filed on Mar. 15, 2017, in the Korean Intellectual Property Office, the disclosures of which are incorporated herein in their entireties by reference.

BACKGROUND

Apparatuses and methods consistent with exemplary embodiments relate to performing link adaptation based on energy efficiency in a wireless communication.

In a wireless communication system, in order to increase spectral efficiency of spatial multiplexing, research and development regarding multiple input multiple output (MIMO) antenna transmission technology and high order modulation have been performed. However, achieving multiplexing gains by spatial multiplexing in every channel environment has been problematic.

SUMMARY

One or more exemplary embodiments may provide a wireless communication apparatus and a link adaptation method thereof to effectively consume electric power in the performance of communication by link adaptation based on energy efficiency when the wireless communication apparatus communicates with a base station.

According to an aspect of an exemplary embodiment, there is provided a link adaptation method of a wireless communication apparatus including a plurality of antennas to receive data signals through a channel from a base station, includes estimating a plurality of data transmission rates of the data signals and power consumptions to process the data signals under a plurality of reception conditions of the wireless communication apparatus based on combinations in a first quantity of transmission ranks from the base station and a second quantity of antennas among the plurality of antennas; calculating a plurality of energy efficiencies by using the power consumptions and the plurality of data transmission rates; generating a state information of the channel to perform a link adaptation based on the plurality of energy efficiencies; and determining a number of antennas to receive the data signals, among the plurality of antennas, based on the plurality of energy efficiencies.

A wireless communication apparatus according to an exemplary embodiment includes a plurality of antennas to receive data signals through a channel from a base station; and a link adaption processor to perform a link adaptation. The link adaption processor includes an energy efficiency calculation processor which calculates a plurality of energy efficiencies by using data transmission rates of the data signals and power consumptions to process the data signals under a plurality of reception conditions of the wireless communication apparatus based on combinations in a first quantity of transmission ranks from the base station and a second quantity of antennas among the plurality of antennas. The link adaption processor generates a state information of the channel by using the plurality of energy efficiencies and determines a number of antennas to receive the data signals, among the plurality of antennas, based on the plurality of energy efficiencies.

According to an aspect of an exemplary embodiment, there is provided a non-transitory computer-readable medium having recorded thereon a computer program which, when executed by a processor of a wireless communication apparatus, causes the wireless communication apparatus to perform a method of a link adaptation, the method including estimating a plurality of data transmission rates of a plurality of data signals to be received from a base station, and power consumptions to process the plurality of data signals under a plurality of reception conditions based on combinations in a first quantity of transmission ranks from the base station and a second quantity of antennas among a plurality of antennas of the wireless communication apparatus; calculating a plurality of energy efficiencies by using the power consumptions and the plurality of data transmission rates; generating a channel state information to perform the link adaptation based on the plurality of energy efficiencies; and determining a number of antennas to receive the plurality of data signals, among the plurality of antennas, based on at least one of the channel state information and the plurality of energy efficiencies.

BRIEF DESCRIPTION OF THE DRAWINGS

FIGS. 3A, 3B, and 3C are diagrams to show information stored in a memory.

FIGS. 6B and 6C are diagrams illustrating pieces of information for the link adaptation method.

FIG. 7 is a flowchart of an operation method of a wireless communication apparatus according to an exemplary embodiment.

DETAILED DESCRIPTION

Figure 1:
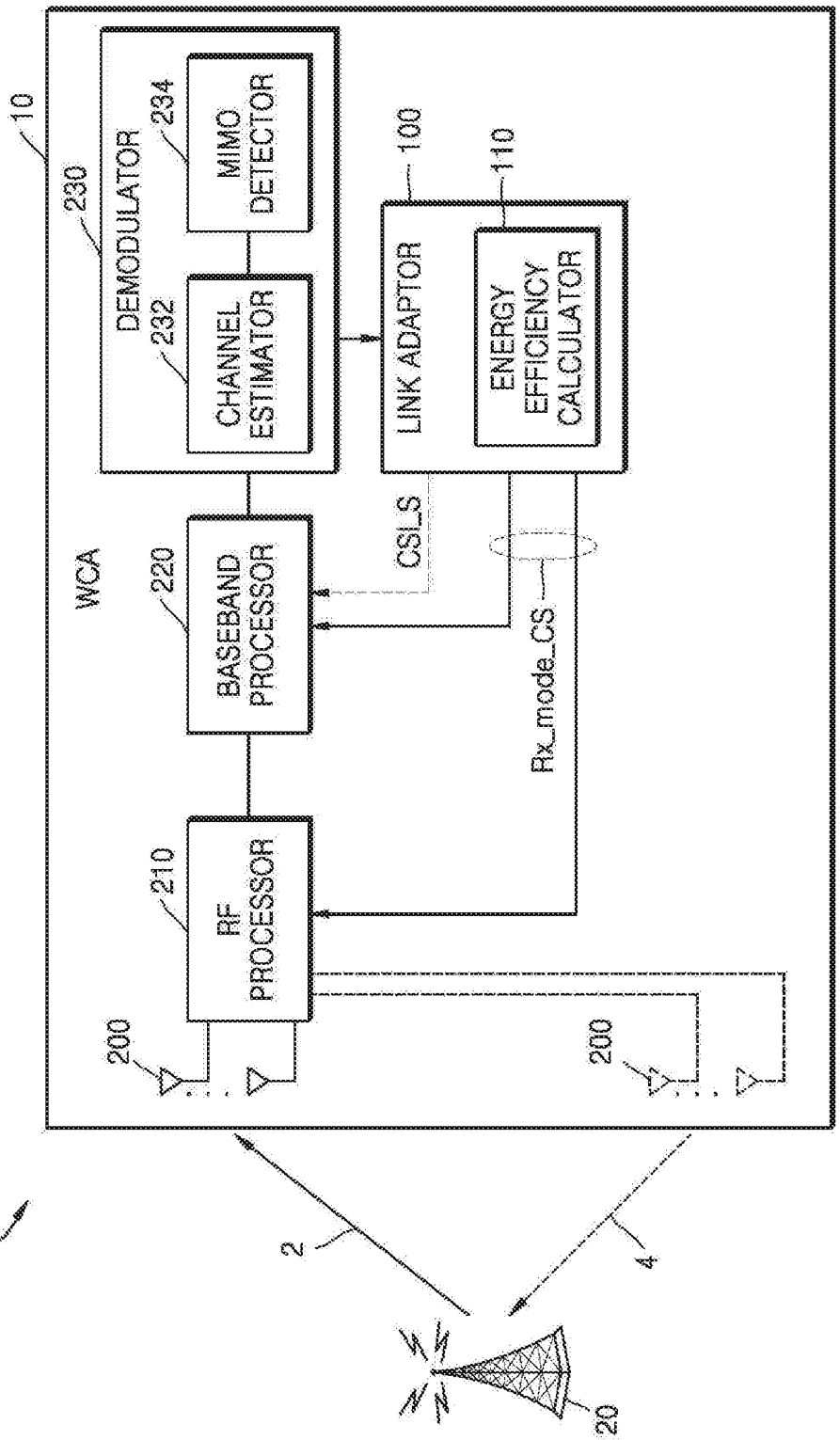
FIG. 1 is a block diagram schematically illustrating a wireless communication system according to an exemplary embodiment.

Referring to FIG. 1, the wireless communication system 1 according to an exemplary embodiment may include a wireless communication apparatus (WCA) 10, e.g., a terminal, and a base station 20, which may communicate to each other through a downlink channel 2 and an uplink channel 4. The wireless communication apparatus 10 may include a plurality of antennas, a radio frequency (RF) processor, a baseband processor 220, a demodulator 230 and a link adaptor 100, e.g., a link adaption processor. Each component included in the wireless communication apparatus 10 may be a hardware block including an analog circuit and/or a digital circuit, or may be a software block including a plurality of instructions performed by a processor, etc.

A wireless communication apparatus 10 may include various apparatuses which may send and receive data and/or control information via communication with the base station 20. For example, the wireless communication apparatus 10 may include any of user equipment (UE), a mobile station (MS), a mobile terminal (MT), a user terminal (UT), a subscribe station (SS), a mobile device, etc. The base station 20 may include a fixed station which communicates with the wireless communication apparatus 10 and/or other base stations, and may transmit and/or receive data by communicating with the wireless communication apparatus 10 and/or other base stations.

The base station 20, for example, may include a Node B, an evolved-Node B (eNB), a base transceiver system (BTS), an access point (AP), etc.

A wireless communication network between the wireless communication apparatus 10 and the base station 20 may support communications between numerous users by sharing available network resources. For example, in the wireless communication network, various methods such as code division multiple access (CDMA), frequency division multiple access (FDMA), time division multiple access (TDMA), orthogonal frequency division multiple access (OFDMA) and single carrier frequency division multiple access (SC-FDMA) may be used to transmit information.

The wireless communication apparatus 10 may receive data signals from the base station 20 through the downlink channel 2. Based on the condition of the downlink channel 2, the wireless communication apparatus 10 may generate channel state information (CSI), i.e., a state information of the channel, to perform link adaptation. The wireless communication apparatus 10 may transmit the CSI to the base station 20 through an uplink channel 4. The CSI may include at least one among a channel quality indicator (CQI), i.e., a quality indicator of the channel, a precoding matrix indicator (PMI) and a rank indicator (RI). The base station 20 may allocate a predetermined number of ranks to the wireless communication apparatus 10 when the data signals are transmitted to the wireless communication apparatus 10 based on the RI, may set a modulation and coding scheme (MCS) based on the CQI, and may perform link adaptation by setting a precoding string based on the PMI.

The RF processor 210 may receive data signals from the base station 20 through the plurality of antennas 200. The data signals may be RF signals having high intermediate frequencies by carrier signals. The RF processor 210 may include an analog down-conversion mixer, and may generate baseband signals by performing down-conversion on frequencies of the data signals. By further including components such as an analog-digital converter, etc., a baseband processor 220 may perform processing operations such as converting the baseband signals into digital signals. The demodulator 230 may include a channel estimator 232, i.e., a channel estimation processor, and a MIMO detector 234. The channel estimator 232 may output channel estimations by estimating a state of the downlink channel 2 by using a reference signal included in the data signals received from the base station 20, and the MIMO detector 234 may demodulate the data signals received from the base station 20 including a plurality of transmission antennas.

The link adaptor 100 according to an exemplary embodiment may generate the CSI for an operation of link adaptation based on energy efficiency and determine the number of receiving antennas (RX) to receive data signals from the base station 20 among the plurality of antennas 200. Determining the number of receiving antennas to receive data signals from the base station 20 among the plurality of antennas 200 may include transforming or determining a reception mode. The link adaptor 100 may change the number of receiving antennas by providing a reception mode control signal Rx_mode_CS to the RF processor 210 and the baseband processor 220 for a link adaptation operation based on energy efficiency. Also, the link adaptor 100 provides a signal CSI_S including CSI generated for the link adaptation operation based on energy efficiency to the baseband processor 220, and the CSI processed by the baseband processor 220 and the RF processor 210 may be provided to the base station 20 through the uplink channel 4. Also, in order to perform link adaptation based on energy efficiency, the link adaptor 100 may further include an energy efficiency calculator 110, i.e., energy efficiency calculation processor.

As the number of transmission ranks to transmit the data signals from the base station 20 increases, the amount of calculations required to demodulate the data signals by the MIMO detector 234 also increases. Accordingly, when the wireless communication apparatus 10 communicates with the base station 20, power consumption for the wireless communication may increase. Also, as the number of receiving antennas to actually receive the data signals among the plurality of antennas 200 increases, the number of RF circuits increases. Accordingly, power consumption for the wireless communication apparatus 10 when the wireless communication apparatus 10 communicates with the base station 20 may increase. For example, reception conditions regarding the numbers of transmission ranks and receiving antennas may be parameters to estimate power consumption of the wireless communication apparatus 10 when the wireless communication apparatus 10 communicates with the base station 20.

The energy efficiency calculator 110 may estimate power consumptions consumed to process data signals under a plurality of reception conditions of the wireless communication apparatus 10 regarding the number of transmission ranks from the base station and the number of receiving antennas among the plurality of antennas. Also, the energy efficiency calculator 110 may estimate transmission rates of the data signals by using the number of transmission ranks under the plurality of reception conditions. The energy efficiency calculator 110 may calculate a plurality of estimated energy efficiencies by using the estimated power consumptions and the estimated data transmission rates. As an example, the estimated energy efficiency may correspond to a ratio between the estimated power consumption and the estimated data transmission rate.

The link adaptor 100 may generate CSI to perform link adaptation based on energy efficiency by using the estimated energy efficiencies and provide the CSI to the baseband processor 220. Also, the link adaptor 100 may determine the number of receiving antennas by using the calculated estimated energy efficiencies, and may control the plurality of antennas 200 through the RF processor 210 and the baseband processor 220 based on the determined number of receiving antennas. In order to perform link adaptation based on energy efficiency, the link adaptor 100 may selectively perform one of generating of the CSI based on energy efficiency and determining the number of receiving antennas, based on the state of the downlink channel 2.

By generating the CSI to perform link adaptation based on energy efficiency and determining the number of receiving antennas, the wireless communication apparatus 10 according to an exemplary embodiment may effectively consume power when communicating with the base station 20, thereby lengthening hours of battery use.

Figure 2:
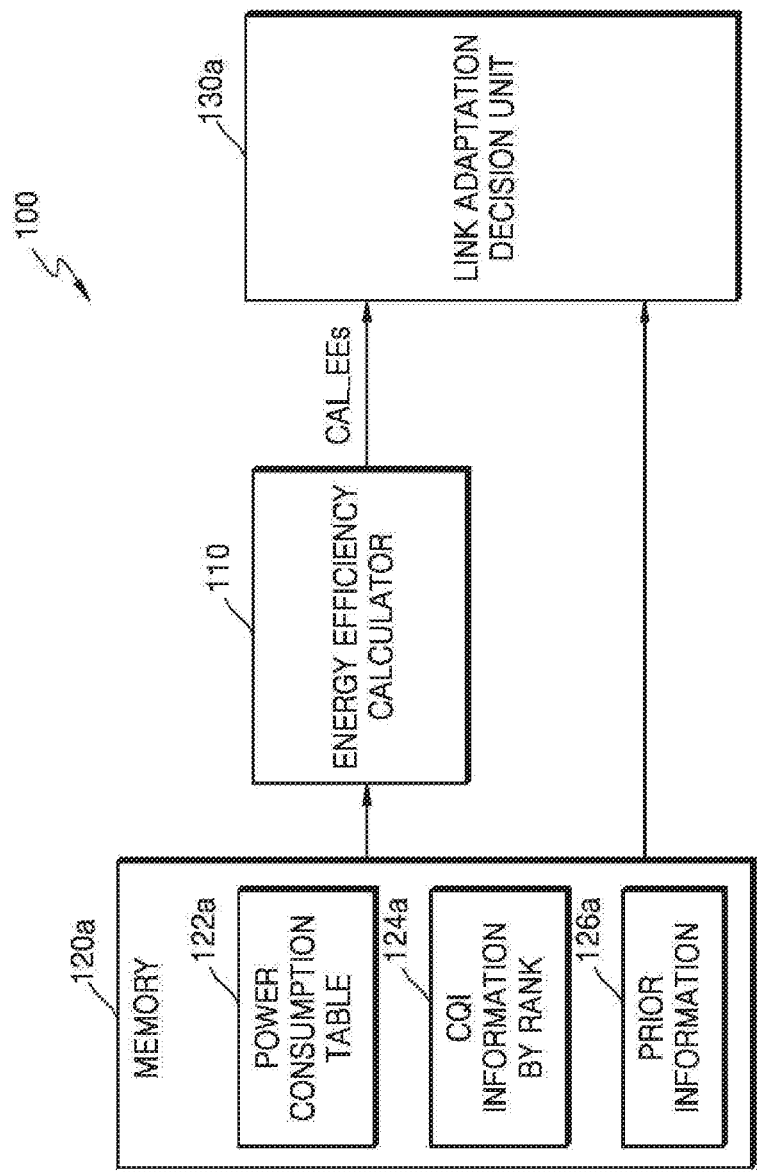
FIG. 2 is a block diagram illustrating a link adaptor according to an exemplary embodiment.
Figure 3C:
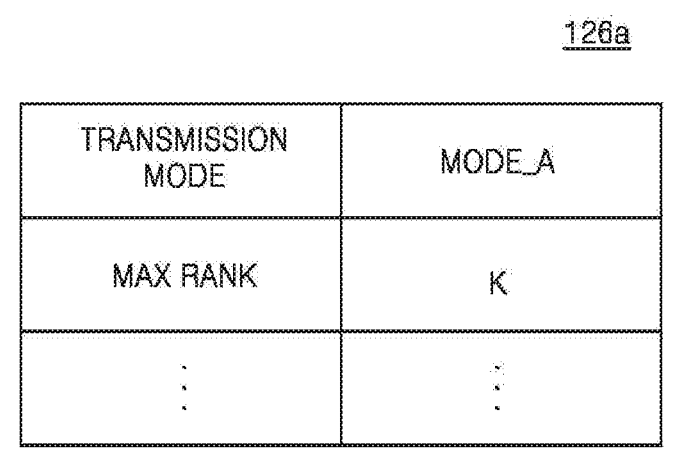

FIG. 2 is a block diagram illustrating a link adaptor 100 according to an exemplary embodiment. FIGS. 3A through 3C show a concept of information stored in a memory.

Referring to FIG. 2, a link adaptor 100 may include the energy efficiency calculator 110, a memory 120a and a link adaptation decision unit 130a, i.e., a link adaptation decision processor. The memory 120a according to an exemplary embodiment may store a power consumption table 122a, a CQI information by rank 124a, and prior information 126a.

The energy efficiency according to an exemplary embodiment may be calculated based on the following Equation (a):

Estimated energy efficiency (bits/J)=Estimated data transmission rate (bps)/Estimated power consumption (Watt=J/s)

With further reference to FIG. 3A, the power consumption table 122a may be pieces of information in a column "Power" representing estimated power consumptions corresponding to different combinations in the number $N_{RANK}$ of transmission ranks, and the number $N_{RX}$ of receiving antennas. For example, when the number $N_{RX}$ of receiving antennas is 4 and the number $N_{RANK}$ of transmission ranks is 4, the estimated power consumption may correspond to 1400 mW. However, the power consumption table 122a in FIG. 3A is an example only and an exemplary embodiment is not limited thereto, and various exemplary values may be applied. With reference to the power consumption table 122a according to an exemplary embodiment, the energy efficiency calculator 110 may change the number $N_{RX}$ of receiving antennas and the number $N_{RANK}$ of transmission ranks and correspondingly acquire estimated power consumptions of modem based on different combinations of the number $N_{RX}$ of receiving antennas and the number $N_{RANK}$ of transmission ranks.

With further reference to FIG. 3B, the CQI information by rank 124a may be information representing CQIs by transmission ranks and estimated data transmission rates corresponding to the CQIs. The CQI information by rank 124a may be CQI information by a number of transmission ranks, with K being a greatest number of transmission ranks allocable by the base station 20. For example, when the number $N_{RANK}$ of transmission ranks is 3 and the CQI is $C_{31}$, an estimated transmission rate may be $Est\_T_{31}$. However, the CQI information by rank 124a shown in FIG. 3B is an example only and an exemplary embodiment is not limited thereto, and various exemplary values may be applied. The estimated transmission rates of the CQI information by rank 124a may be parameters used to calculate estimated energy efficiency, and may be different from actual data transmission rates. With reference to the CQI information by rank 124a, the energy efficiency calculator 110 may change the value of CQIs for each number of the transmission ranks and may acquire estimated transmission rates corresponding to each of the CQIs.

With further reference to FIG. 3C, the prior information 126a may include information regarding a transmission mode in FIG. 1 when transmitting the data signals from the base station 20 to the wireless communication apparatus 10 and a greatest number of transmission ranks MAX RANK allocable to the wireless communication apparatus 10. For example, the transmission mode in the case of transmitting the data signals from the base station 20 to the wireless communication apparatus 10 in FIG. 1 may be MODE_A and the greatest number of transmission ranks MAX RANK may be K, i.e., a third quantity.

The link adaptation decision unit 130a according to an exemplary embodiment may control generation of pieces of CSI with reference to the prior information 126a. The link adaptation decision unit 130a may control the operation of generating the pieces of CSI including pieces of information corresponding to the transmission mode. For example, based on the transmission mode, the link adaptation decision unit 130a may control the operation of generating CSI including pieces of information corresponding to the transmission mode. For example, based on the transmission mode, the link adaptation decision unit 130a may control the operation of generating CSI including at least one among RI, CQI, and PMI.

The link adaptation decision unit 130a may determine the number of receiving antennas with reference to the prior information 126a based on the information regarding the greatest number of allocable transmission ranks MAX RANK. For example, when the greatest number of allocable transmission ranks MAX RANK is 4, the link adaptation decision unit 130a may determine the number of receiving antennas within a range to be equal to or less than 3.

Pieces of information of the power consumption table 122a, the CQI information by rank 124a, and the prior information 126a shown in FIGS. 3A through 3C are examples only and exemplary embodiments are not limited thereto. For example, the memory 120a may store various pieces of information so that the energy efficiency calculator 110 may calculate energy efficiency more effectively, and the pieces of information of the power consumption table 122a, the CQI information by rank 124a, and the prior information 126a may be stored in a predetermined memory region of the energy efficiency calculator 110. Also, at least one among the pieces of information of the power consumption table 122a, the CQI information by rank 124a, and the prior information 126a shown in FIGS. 3A through 3C may be subjected to changes of a base station 20 to another base station, transformation according to a state of the downlink channel 2 or uplink channel 4, or may be updated periodically.

Referring to FIG. 2 and Equation (a), in order to calculate estimated energy efficiency having a unit of (bits/J), the energy efficiency calculator 110 may acquire an estimated power consumption having a unit of Watt according to each of the numbers of transmission ranks and receiving antennas with reference to the power consumption table 122a, and may acquire estimated transmission rates having a unit of (bps) according to CQIs of each transmission rank with reference to the CQI information by rank 124a. In an exemplary embodiment, the energy efficiency calculator 110 may estimate power consumptions consumed to process data signals and data transmission rates of the data signals with reference to the power consumption table 122a and the CQI information by rank 124a, and may calculate a plurality of estimated energy efficiencies by using the estimated power consumptions and the estimated data transmission rates. For example, with reference to the power consumption table 122a, the energy efficiency calculator 110 may acquire an estimated power consumption of 1400 mW when the number $N_{RX}$ of receiving antennas and the number $N_{RANK}$ of transmission ranks are (4, 4), and with reference to the CQI information by rank 124a, may acquire estimated transmission rates $Est\_T_{41}$ to $Est\_T_{4N}$ corresponding to each of the CQI $C_{41}$ to $C_{4N}$ when the number $N_{RANK}$ of transmission ranks is 4. The energy efficiency calculator 110 may calculate estimated energy efficiencies by using the acquired estimated transmission rates $Est\_T_{41}$ to $Est\_T_{4N}$ and estimated power consumption 1400 mW. Likewise, the energy efficiency calculator 110 may calculate energy efficiencies by using estimated power consumptions which correspond to the number $N_{RX}$ of receiving antennas and the number $N_{RANK}$ of transmission ranks having values different than (4, 4), and estimated data transmission rates corresponding to the number $N_{RANK}$ of transmission ranks.

The energy efficiency calculator 110 may provide the estimated energy efficiencies CAL_EEs calculated by using the estimated power consumptions and estimated data transmission rates to the link adaptation decision unit 130a. As an example, the link adaptation decision unit 130a may control generation of CSI used to perform link adaptation based on energy efficiency by using the calculated estimated energy efficiencies CAL_EEs, and may determine the number of receiving antennas to receive data signals from the base station 20.

According to an exemplary embodiment, by calculating a plurality of estimated energy efficiencies by using the power consumption table 122a and the CQI information by rank 124a, the energy efficiency calculator 110 may effectively reduce the amount of calculations.

Figure 4:
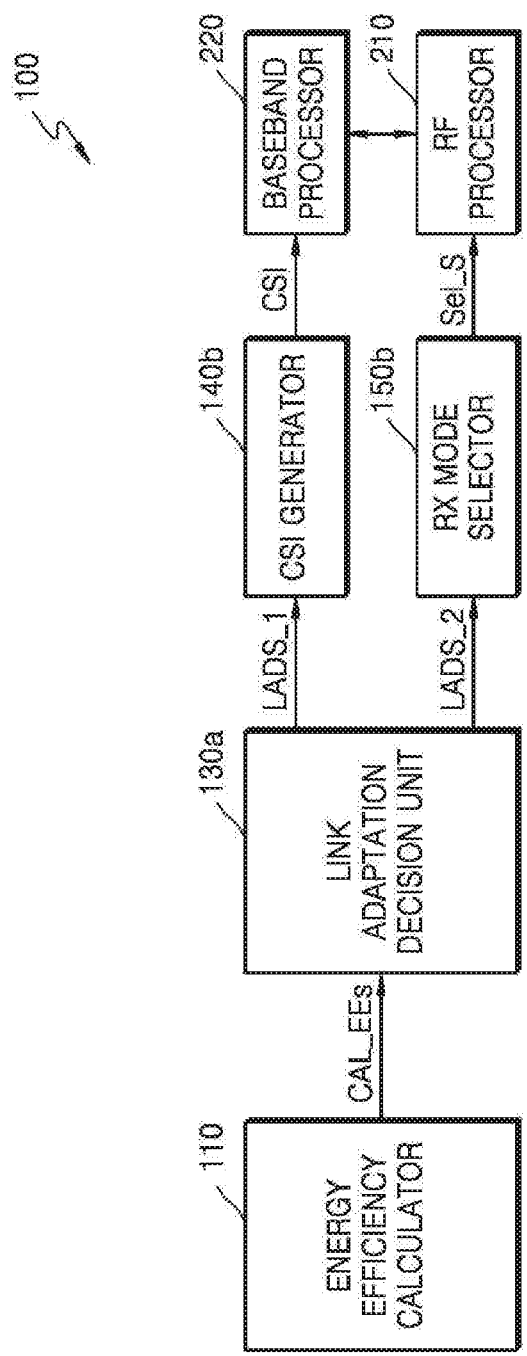
FIG. 4 is a block diagram illustrating a link adaptor according to an exemplary embodiment.

FIG. 4 is a block diagram illustrating the link adaptor 100 according to an exemplary embodiment.

Referring to FIG. 4, a link adaptor 100 may include an energy efficiency calculator 110, a link adaptation decision unit 130a, a CSI generator 140b and an RX mode selector 150b. The energy efficiency calculator 110 may provide the calculated estimated energy efficiencies CAL_EEs to the link adaptation decision unit 130a. The link adaptation decision unit 130a may compare the calculated estimated energy efficiencies CAL_EEs with each other, and may generate a first link adaptation decision signal LADS_1 and a second link adaptation decision signal LADS_2 based on a reception condition corresponding to an estimated energy efficiency having the greatest value among the calculated estimated energy efficiencies CAL_EEs, based on the comparison.

For example, when an estimated energy efficiency, which is calculated by using an estimated power consumption of 1040 mW when the number $N_{RX}$ of receiving antennas and the number $N_{RANK}$ of transmission ranks are (2, 2) in FIG. 3A and an estimated data transmission rate of $Est\_T_{22}$ when the number $N_{RANK}$ of transmission ranks is 2 and the CQI is $C_{22}$ in FIG. 3B, has the greatest value among estimated energy efficiencies CAL_EEs, the link adaptation decision unit 130a may control the CSI generator 140b to generate RI to advise the base station to transmit data signals to the wireless communication apparatus 10 by allocating two transmission ranks to the wireless communication apparatus 10 and CSI including CQI to advise the base station 20 to perform modulation-coding on the data signals by the MCS according to a value of CQI equal to $C_{22}$. Also, the link adaptation decision unit 130a may determine the number of receiving antennas to be 2 among the plurality of antennas included in the wireless communication apparatus 10.

The CSI generator 140b may receive the first link adaptation decision signal LADS_1 from the link adaptation decision unit 130a and may output the CSI based on the first link adaptation decision signal LADS_1. As an example, based on a transmission mode of the base station 20 included in the prior information 126a (refer to FIG. 3C), the CSI generator 140b may output the CSI including at least one among the RI, CQI and PMI. The CSI generator 140b output the CSI to the baseband processor 220 in FIG. 1, and the baseband processor 220 may transmit the CSI to the base station 20 through the RF processor 210 and the plurality of antennas 200 after performing a predetermined process on the CSI.

The RX mode selector 150b may receive the second link adaptation decision signal LADS_2 from the link adaptation decision unit 130a, and may output a receiving antenna selection signal Sel_S based on the second link adaptation decision signal LADS_2. As an example, the RX mode selector 150b may output the receiving antenna selection signal Sel_S based on the greatest number of transmission ranks allocable to the wireless communication apparatus 10 included in the prior information 126a of FIG. 3C or the transmission mode of the base station 20. The RX mode selector 150b may output the receiving antenna selection signal Sel_S to the RF processor 210, and the RF processor 210 may select and activate at least one among the plurality of antennas 200 based on the receiving antenna selection signal Sel_S and may control the antenna to operate as a receiving antenna.

The link adaptation decision unit 130a may set a cycle of link adaptation based on energy efficiency, and may set a cycle of generating CSI and a cycle of determining receiving antennas. For example, the link adaptation decision unit 130a may set the cycle of generating CSI and the cycle of determining receiving antennas to be equal to the cycle of link adaptation based on energy efficiency. However, it is an example only and an exemplary embodiment is not limited thereto.

Figure 5:
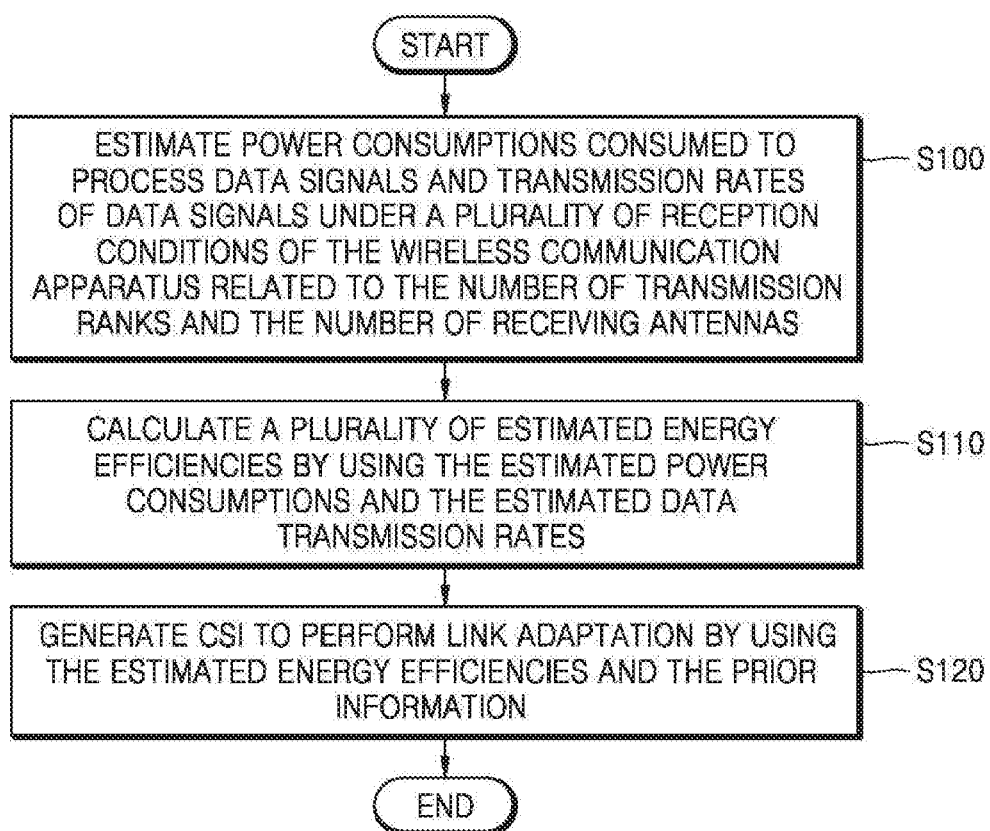
FIG. 5 is a flowchart illustrating a link adaptation method of a wireless communication apparatus for performing link adaptation based on energy efficiency according to an exemplary embodiment.

FIG. 5 is a flowchart illustrating a link adaptation method of the wireless communication apparatus 10 for performing link adaptation based on energy efficiency, according to an exemplary embodiment.

Referring to FIG. 5, the wireless communication apparatus 10 may estimate power consumptions consumed to process data signals and transmission rates of data signals under the plurality of reception conditions of the wireless communication apparatus 10 related to the number of transmission ranks and the number of receiving antennas in the case of receiving data signals through the downlink channel 2 (operation S100). The wireless communication apparatus 10 calculates a plurality of estimated energy efficiencies by using the estimated power consumptions and the estimated data transmission rates (operation S110). The wireless communication apparatus 10 may generate CSI to perform link adaptation based on energy efficiency and determine the number of receiving antennas among the plurality of antennas by using at least one among the estimated energy efficiencies and the prior information 126a (operation S120). In detail, the wireless communication apparatus 10 may generate CSI and determine the number of receiving antennas by using a signal condition, among the reception conditions, corresponding to the estimated energy efficiency having the greatest value among the estimated energy efficiencies.

Figure 6A:
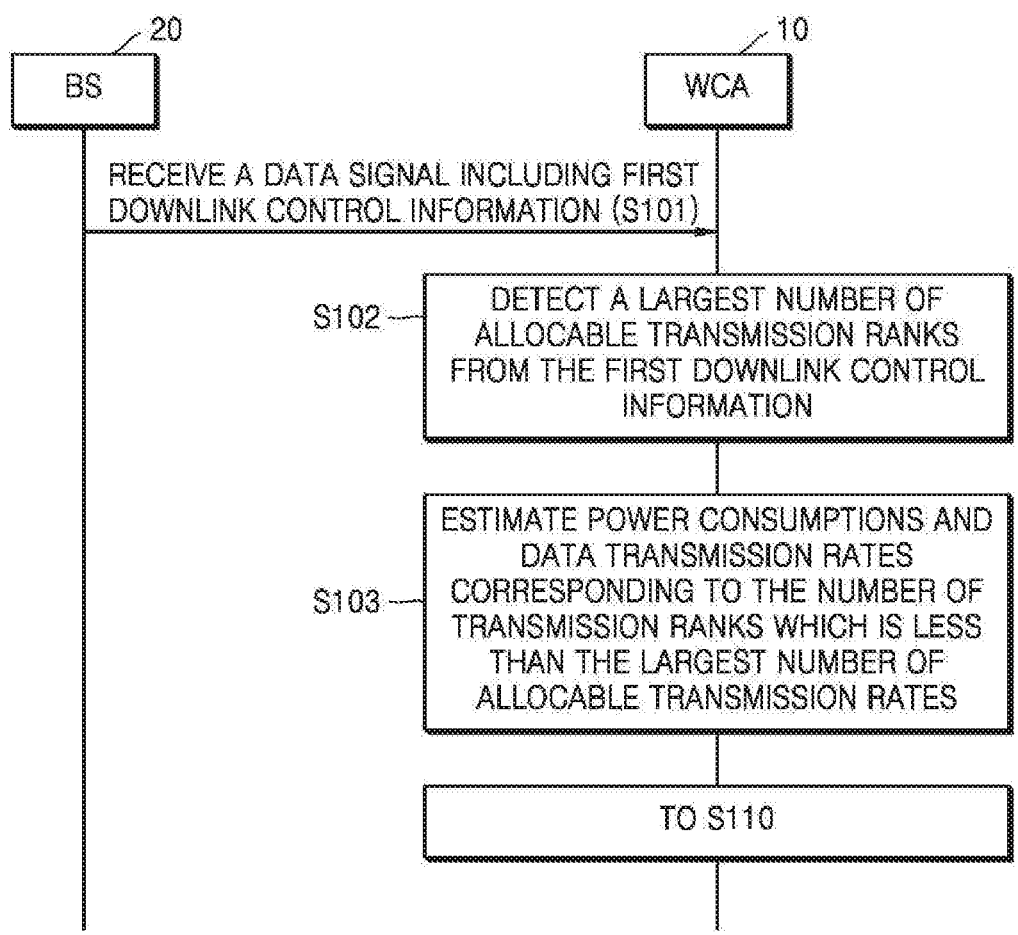
FIG. 6A is a flowchart illustrating a link adaptation method of a wireless communication apparatus to reduce the amount of calculations in calculating estimated energy efficiencies according to an exemplary embodiment.

FIG. 6A is a flowchart illustrating a link adaptation method of the wireless communication apparatus 10 to reduce the amount of calculations in the case of calculating estimated energy efficiencies according to an exemplary embodiment, and FIGS. 6B and 6C are diagrams illustrating pieces of information for the link adaptation method of the wireless communication apparatus 10.

Referring to FIG. 6A, the wireless communication apparatus 10 may receive a data signal including first downlink control information through the downlink channel 2 from the base station 20 (operation S101), e.g., an initial transmission. From the first downlink control information, the wireless communication apparatus 10 may detect a greatest number of transmission ranks allocable to the wireless communication apparatus 10 by the base station 20 (operation S102). The wireless communication apparatus 10 may estimate power consumptions and data transmission rates corresponding to the number of transmission ranks which is less than the greatest number of allocable transmission ranks detected from the first downlink control information (operation S103). However, an exemplary embodiment is not limited thereto and the operation S103 may use the greatest number of allocable transmission ranks included in the prior information 126a (refer to FIG. 3C). For example, the prior information 126a may indicate the greatest number of allocable transmission ranks MAX RANK that was detected and stored from predetermined downlink control information received from the base station 20 during the link adaptation operation which was performed in advance, e.g., in an earlier calculation cycle. After that, operation S110 of FIG. 5 may be performed.

When the wireless communication apparatus 10 performs link adaptation based on energy efficiency, most communication may be performed to reduce the number of transmission ranks allocated to the wireless communication apparatus 10. In accordance with this, by limiting the number of transmission ranks to be less than the greatest number of allocable ranks among the plurality of reception conditions of the wireless communication apparatus 10 and estimating power consumptions and data transmission rates, the wireless communication apparatus 10 may reduce the amount of calculations in calculating energy efficiencies. However, this is an example only and an exemplary embodiment is not limited thereto. As a further example, the wireless communication apparatus 10 may estimate power consumptions and data transmission rates while limiting the numbers of transmission ranks less than the greatest number of allocable transmission ranks by a predetermined value or more among the plurality of reception conditions of the wireless communication apparatus 10, thereby further reducing the amount of calculations in calculating energy efficiencies. In the following description, it is assumed that the greatest number of allocable transmission ranks detected from the first downlink control information is 4, i.e., K is equal to 4 in FIG. 3B.

With further reference to FIG. 6B, referring to the power consumption table 122a, the wireless communication apparatus 10 may acquire estimated power consumptions in the case the number $N_{RANK}$ of transmission ranks is equal to or less than 3 based on the greatest number of allocable transmission ranks MAX_RANK which is 4. With further reference to FIG. 6C, the wireless communication apparatus 10, referring to the CQI information by rank 124a, may acquire estimated transmission rates corresponding to each of CQIs in the case that the number $N_{RANK}$ of transmission ranks is equal to or less than 3 based on the greatest number of allocable transmission ranks MAX_RANK which is 4. By acquiring a smaller number of estimated power consumptions and estimated transmission rates than that shown in the exemplary embodiment of FIG. 3A, and by using the relatively smaller number of estimated power consumptions and estimated transmission rates, the wireless communication apparatus 10 may reduce the amount of calculations.

FIG. 7 is a flowchart of an operation method of the wireless communication apparatus 10 when changing a number of receiving antennas according to an exemplary embodiment.

In order to prevent problems such as a decoding error which may occur in performance of link adaptation based on energy efficiency by changing the number of receiving antennas (a case in which a number of receiving antennas less than a previous number of receiving antennas is determined and antennas are controlled based on the result), the wireless communication apparatus 10 may perform operations described below.

Referring to FIG. 7, the CSI generated by performing operation S120 of FIG. 5 may be provided to the base station 20 (operation S121). After this, the wireless communication apparatus 10 may receive data signals including second downlink control information from the base station (operation S122). The wireless communication apparatus 10 may detect a number of current transmission ranks, i.e., in a current transmission mode, from the second downlink control information (operation S130). The wireless communication apparatus 10 may compare the number of current transmission ranks to the CSI which was provided to the base station (operation S140). More particularly, the wireless communication apparatus 10 may distinguish whether the base station 20 has allocated transmission ranks to the wireless communication apparatus 10 in accordance with RI included in the CSI. The wireless communication apparatus 10 may control the plurality of antennas in accordance with the number of receiving antennas determined based on the result of the comparison (operation S150). For example, the wireless communication apparatus 10 may control the plurality of antennas in accordance with the number of receiving antennas determined when it is distinguished that the base station 20 allocated transmission ranks to the wireless communication apparatus 10 in accordance with the RI included in the CSI.

Figure 8:
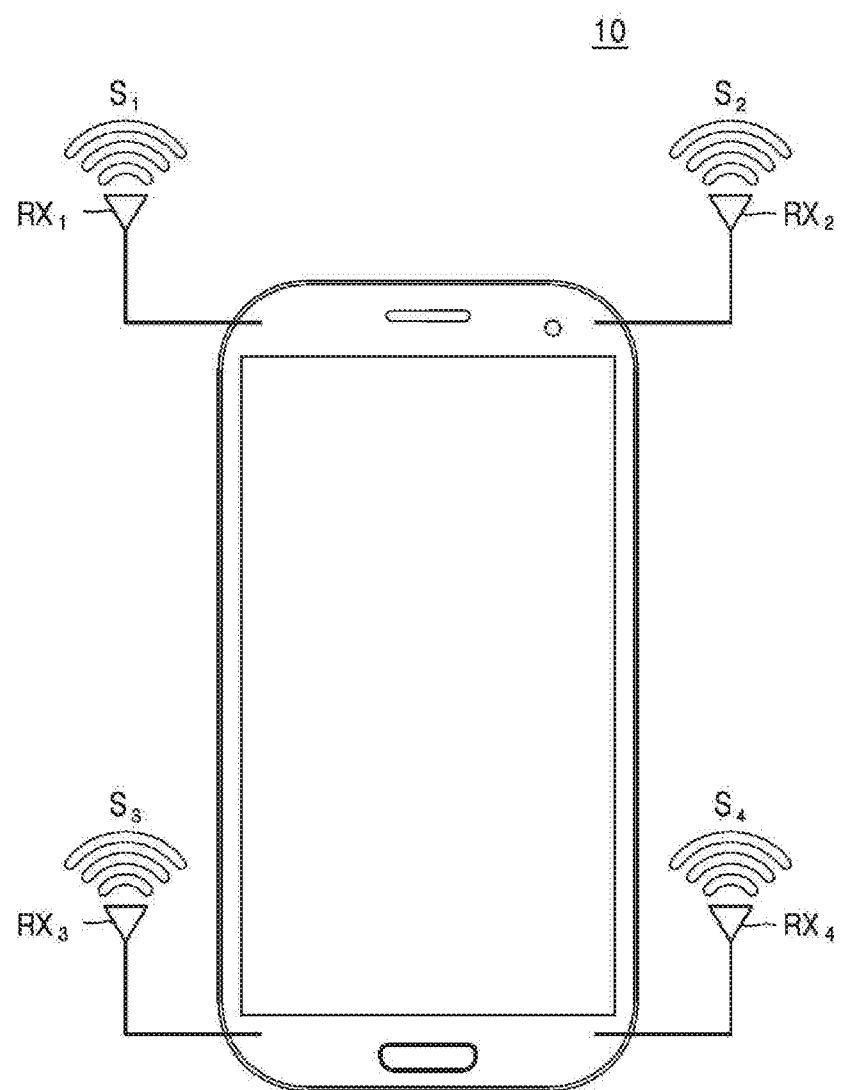
FIG. 8 is a diagram illustrating the wireless communication apparatus performing a reception mode selection according to an exemplary embodiment.

FIG. 8 is a diagram illustrating the wireless communication apparatus 10 to illustrate operations of the RX mode selector in controlling the plurality of antennas according to an exemplary embodiment.

Referring to FIG. 8, the wireless communication apparatus 10 may include a plurality of antennas $RX_1$, $RX_2$, $RX_3$, and $RX_4$. The RX mode selector 150b illustrated in FIG. 4, based on the number of receiving antennas determined by the link adaptation decision unit 130a, may select and activate at least one among the plurality of antennas $RX_1$ to $RX_4$ and control the antenna to operate as a receiving antenna. As an example, the RX mode selector 150b may select receiving antennas in consideration of reception sensitivities $S_1$, $S_2$, $S_3$, and $S_4$ of each of the plurality of antennas $RX_1$ to $RX_4$. For example, when the number of receiving antennas that is determined as 2, two antennas having larger values of reception sensitivities may be selected and activated.

By the operation of selecting receiving antennas in consideration of the reception sensitivities by the RX mode selector 150b according to an exemplary embodiment, the link adaptation which may maximize energy efficiency may be achieved.

Figures 9A, 9B:
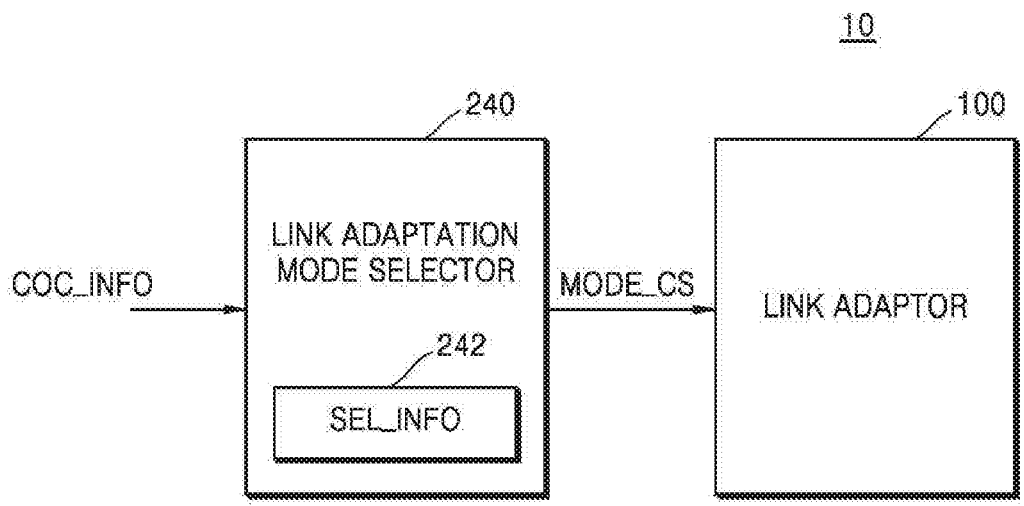
FIG. 9A is a block diagram illustrating a wireless communication apparatus selecting a link adaptation mode according to an exemplary embodiment.
FIG. 9B is a diagram representing pieces of reference information for selection of the link adaptation mode.

FIG. 9A is a block diagram illustrating the wireless communication apparatus 10 selecting a link adaptation mode according to an exemplary embodiment, and FIG. 9B is a diagram representing pieces of reference information for selection of the link adaptation mode.

Referring to FIG. 9A, the wireless communication apparatus 10 may include a link adaptation mode selector 240, i.e., a link adaptation mode selection processor, and the link adaptor 100. The link adaptation mode selector 240 may receive information regarding a condition of communication COC_INFO of the wireless communication apparatus 10. The link adaptation mode selector 240 may select one of a frequency efficiency-based link adaptation mode and an energy efficiency-based link adaptation mode based on the information regarding the condition of communication COC_INFO.

With further reference to FIG. 9B, the information regarding the condition of communication COC_INFO may include information regarding at least one among a battery level of the wireless communication apparatus 10, an energy efficiency level, a channel correlation level of the downlink channel 2, a receiving antenna number, a max rank number that is allocable to the wireless communication apparatus 10 by the base station 20, and a Doppler shifting level of the wireless communication apparatus 10. Mode selection information SEL_INFO 242 including reference level information set in advance for each of the battery level of the wireless communication apparatus 10, the energy efficiency level, the channel correlation level of the downlink channel 2, the receiving antenna number, the max rank number allocable to the wireless communication apparatus 10 by the base station 20, and the Doppler shifting level of the wireless communication apparatus 10 may be stored in the link adaptation mode selector 240.

For example, the link adaptation mode selector 240 may select an energy efficiency-based link adaptation mode when the information regarding the condition of communication COC_INFO includes information regarding the battery level which is equal to or lower than first reference level information REF_LV1, includes the information regarding the energy efficiency level which is equal to or lower than second reference level information REF_LV2, includes information regarding the channel correlation level of the downlink channel 2 which is equal to or higher than third reference level information REF_LV3, includes information regarding the receiving antenna number which is equal to or higher than fourth reference level information REF_LV4, and/or includes information regarding the Doppler shifting level which is equal to or higher than sixth reference level information REF_LV6.

Otherwise, if one or more of the conditions above is not satisfied, the link adaptation mode selector 240 may select the link adaptation mode to be the frequency efficiency-based link adaptation mode.

As described above, the link adaptation mode selector 240 may select the link adaptation mode and output a mode control signal MODE_CS to the link adaptor 100 based on the selection. The link adaptor 100 may perform link adaptation based on the mode control signal MODE_CS.

As described above, by selecting one of the energy efficiency-based link adaptation mode and the frequency efficiency-based link adaptation mode according to the condition of communication of the wireless communication apparatus 10, the link adaptor 100 may improve the performance of communication of the wireless communication apparatus 10.

Figure 10:
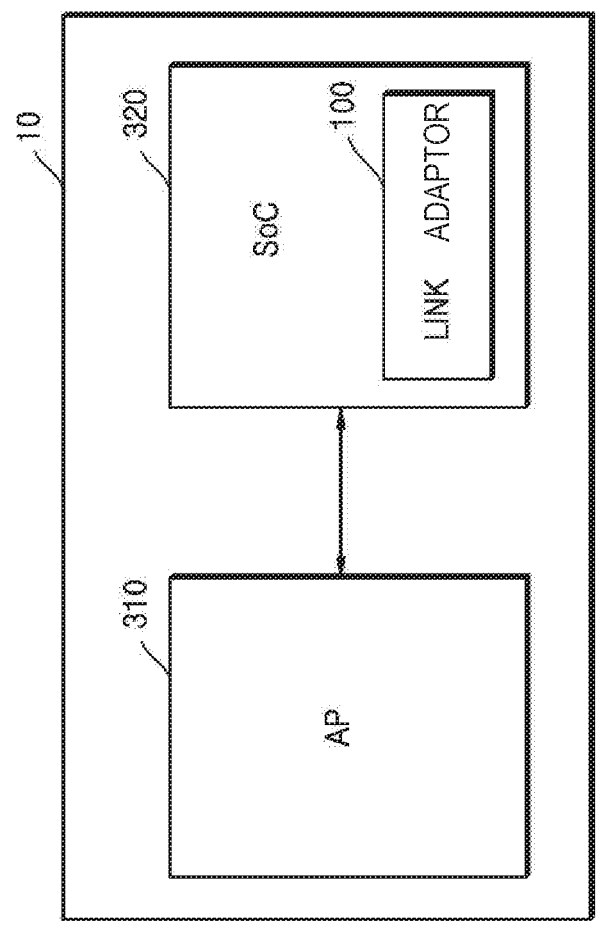
FIG. 10 is a block diagram illustrating a system on chip (SoC) which performs link adaptation based on energy efficiency, according to an exemplary embodiment.

FIG. 10 is a block diagram illustrating an SoC 320 which performs link adaptation based on energy efficiency, according to an exemplary embodiment.

Referring to FIG. 10, an SoC 320 may be placed on the wireless communication apparatus 10 and controlled by an application processor 310 placed on the wireless communication apparatus 10. Also, the SoC 320 may include a link adaptor 100 which may perform link adaptation based on energy efficiency according to exemplary embodiments described above.

The link adaptor 100 may perform link adaptation based on energy efficiency in a hardware-friendly method or a software-friendly method. Similar to the embodiments described above, in the case of performing link adaptation in a software-friendly method, the link adaptor 100 may include a memory which stores a program including various modules and a processor executing the program stored in the memory.

What is claimed is:

1. An operating method of a wireless communication apparatus which includes a plurality of antennas and receives a data signal through a downlink channel from a base station, the operating method comprising:
    calculating a plurality of estimated energy efficiencies under a plurality of reception conditions of the wireless communication apparatus based on prior information regarding a number of transmission ranks and a number of receiving antennas to be used for receiving the data signal;
    generating channel state information by using the plurality of estimated energy efficiencies; and
    determining the number of receiving antennas for receiving the data signal, based on the channel state information, among the plurality of antennas,
    wherein the calculating the plurality of estimated energy efficiencies further comprises:
        sorting power consumptions and data transmission rates in accordance with the prior information from a power consumption table and channel quality indicator information, and
        calculating the plurality of estimated energy efficiencies by using the sorted power consumptions and the sorted data transmission rates, and
    wherein the sorting the power consumptions and the data transmission rates further comprises:
        sorting the power consumptions and the data transmission rates corresponding to the number of transmission ranks that is smaller than a largest number of transmission ranks that is allocable to the wireless communication apparatus by the base station.

2. The operating method of claim 1, wherein the power consumption table indicates power consumptions expected to be used for processing the data signal under each of the plurality of reception conditions according to the number of transmission ranks and the number of receiving antennas.

3. The operating method of claim 1, wherein the channel quality indicator information indicates data transmission rates of the data signal that are expected from each of the plurality of reception conditions according to a channel quality indicator of each of the transmission ranks.

4. The operating method of claim 1, wherein the prior information comprises information regarding the largest number of transmission ranks that is allocable to the wireless communication apparatus by the base station.

5. The operating method of claim 1, wherein the plurality of estimated energy efficiencies are determined based on rates between the sorted power consumptions and the sorted data transmission rates.

6. The operating method of claim 1, further comprising:
    selecting one of an energy efficiency-based link adaptation mode or a frequency efficiency-based link adaptation mode to be a link adaptation mode of the wireless communication apparatus, based on information regarding communication operation conditions.

7. The operating method of claim 6, wherein the information regarding the communication operation conditions comprises at least one of a battery level of the wireless communication apparatus, an energy efficiency level, a channel relation level of the downlink channel, the determined number of receiving antennas, or a Doppler shifting level of the wireless communication apparatus.

8. The operating method of claim 1, wherein the prior information is information detected from downlink channel control information received from the base station or information previously stored in the wireless communication apparatus as a result of a previous link adaptation operation of the wireless communication apparatus.

9. The operating method of claim 1, further comprising:
transmitting the generated channel state information to the base station;
receiving the data signal including downlink control information from the base station; and
controlling the plurality of antennas based on the downlink control information.

10. The operating method of claim 9, wherein the controlling the plurality of antennas further comprises:
selecting and activating at least one of the plurality of antennas in accordance with the determined number of receiving antennas based on a reception sensitivity of each of the plurality of antennas.

11. A non-transitory computer-readable medium having recorded thereon at least one instruction which, when executed by a processor of the wireless communication apparatus, causes the wireless communication apparatus to perform the operating method of claim 1.

12. An operating method of a wireless communication apparatus which includes a plurality of antennas and receives a data signal from a base station, the operating method comprising:
sorting some of a plurality of reception conditions of the wireless communication apparatus based on a number of transmission ranks and a number of receiving antennas among the plurality of antennas;
calculating energy efficiencies by using power consumptions used for processing the data signal under the some of the plurality of reception conditions that are sorted and data transmission rates of the data signal;
generating channel state information for executing energy efficiency-based link adaptation by using the calculated energy efficiencies;
determining the number of receiving antennas for receiving the data signal based on the channel state information; and
transmitting the generated channel state information to the base station,
wherein the sorting the some of the plurality of reception conditions further comprises:
sorting a number of the plurality of reception conditions corresponding to the number of transmission ranks that is smaller than a largest number of transmission ranks that is allocable to the wireless communication apparatus.

13. The operating method of claim 12, wherein the calculating the energy efficiencies further comprises:
obtaining power consumptions sorted from a power consumption table indicating estimated power consumptions corresponding to the number of transmission ranks and the number of receiving antennas;
obtaining data transmission rates sorted from channel quality indicator information indicating information regarding estimated data transmission rates corresponding to a channel quality indicator for each transmission rank; and
calculating the energy efficiencies by using the sorted power consumptions and the sorted data transmission rates.

14. The operating method of claim 13, wherein the generating the channel state information further comprises:
comparing the calculated energy efficiencies; and
generating the channel state information based on a reception condition corresponding to a largest energy efficiency among the calculated energy efficiencies.

15. A wireless communication apparatus comprising:
a plurality of antennas configured to receive a data signal through a downlink channel from a base station;
a memory configured to store prior information for energy efficiency-based link adaptation; and
a processor configured to execute link adaptation based on the prior information,
wherein the processor is further configured to:
calculate a plurality of estimated energy efficiencies under reception conditions in accordance with the prior information regarding a number of transmission ranks and a number of receiving antennas to be used for receiving the data signal,
generate channel state information by using the plurality of estimated energy efficiencies, and
determine the number of receiving antennas based on the channel state information, among the plurality of antennas,
wherein the memory is further configured to store a power consumption table, indicating power consumptions expected to be used for processing the data signal under each of a plurality of first conditions according to the number of transmission ranks and the number of receiving antennas, and channel quality indicator information representing data transmission rates of the data signal expected under each of a plurality of second conditions according to a channel quantity indicator of each of the transmission ranks, and
wherein the processor is further configured to sort power consumptions and data transmission rates in accordance with the prior information from the power consumption table and the channel quality indicator information and calculate the plurality of estimated energy efficiencies by using the sorted power consumptions and the sorted data transmission rates.

16. The wireless communication apparatus of claim 15, wherein the prior information comprises information regarding a largest number of transmission ranks that is allocable to the wireless communication apparatus by the base station.

17. The wireless communication apparatus of claim 15, wherein the processor is further configured to sort the power consumptions and the data transmission rates corresponding to the number of transmission ranks that is smaller than a largest number of transmission ranks that is allocable to the wireless communication apparatus by the base station.

* * * * *